United States Patent
Kemp et al.

(10) Patent No.: US 9,376,810 B2
(45) Date of Patent: Jun. 28, 2016

(54) MULTI-LAYER CEILING TILE

(71) Applicant: USG Interiors, LLC, Chicago, IL (US)

(72) Inventors: Brian A. Kemp, Oak Brook, IL (US); Wei Xu, Hayward, WI (US)

(73) Assignee: USG INTERIORS, LLC, Chicago, IL (US)

( * ) Notice: Subject to any disclaimer, the term of this patent is extended or adjusted under 35 U.S.C. 154(b) by 51 days.

(21) Appl. No.: 14/261,682

(22) Filed: Apr. 25, 2014

(65) Prior Publication Data

US 2015/0308111 A1    Oct. 29, 2015

(51) Int. Cl.

| | |
|---|---|
| *E04B 1/82* | (2006.01) |
| *E04B 1/84* | (2006.01) |
| *E04B 9/00* | (2006.01) |
| *B32B 5/26* | (2006.01) |
| *B32B 7/08* | (2006.01) |
| *B32B 7/12* | (2006.01) |
| *B32B 37/06* | (2006.01) |
| *B32B 37/12* | (2006.01) |
| *B32B 37/18* | (2006.01) |
| *D04H 1/46* | (2012.01) |
| *E04B 9/04* | (2006.01) |
| *E04B 1/74* | (2006.01) |

(52) U.S. Cl.
CPC . *E04B 9/001* (2013.01); *B32B 5/26* (2013.01); *B32B 7/08* (2013.01); *B32B 7/12* (2013.01); *B32B 37/06* (2013.01); *B32B 37/12* (2013.01); *B32B 37/18* (2013.01); *D04H 1/46* (2013.01); *E04B 1/8209* (2013.01); *E04B 1/84* (2013.01); *E04B 9/045* (2013.01); *B32B 2262/101* (2013.01); *B32B 2262/108* (2013.01); *B32B 2307/102* (2013.01)

(58) Field of Classification Search
USPC .................. 181/290, 294, 286, 204, 205
See application file for complete search history.

(56) References Cited

U.S. PATENT DOCUMENTS

| | | | |
|---|---|---|---|
| 1,769,519 A | 7/1930 | King et al. | |
| 3,183,996 A * | 5/1965 | Capaul | E04B 1/90 181/291 |
| 3,498,404 A | 3/1970 | Roberts | |
| 4,040,213 A | 8/1977 | Capaul | |
| 4,214,646 A * | 7/1980 | Planes et al. | 181/287 |
| 4,428,454 A * | 1/1984 | Capaul | E04B 1/86 181/290 |
| 4,434,592 A * | 3/1984 | Reneault et al. | 52/145 |
| 4,838,524 A * | 6/1989 | McKeown et al. | 256/24 |
| 4,847,140 A * | 7/1989 | Jaskowski | 428/220 |
| 4,849,281 A | 7/1989 | Brandon et al. | |
| 5,013,405 A | 5/1991 | Izard | |
| 5,047,120 A | 9/1991 | Izard et al. | |
| 5,250,153 A | 10/1993 | Izard et al. | |

(Continued)

OTHER PUBLICATIONS

International Search Report and Written Opinion of the International Searching Authority dated Jul. 28, 2015 for PCT/US2015/026333, filed Apr. 17, 2015.

*Primary Examiner* — Edgardo San Martin
(74) *Attorney, Agent, or Firm* — Pearne & Gordon LLP

(57) ABSTRACT

A less costly multi-layer acoustical panel having improved noise absorption properties includes a fiberglass layer and a mineral wool layer wherein the fiberglass layer has a fibrous content comprising at least about 50% by weight of glass fiber and the mineral wool layer has a fibrous content comprising at least about 50% by weight of mineral wool fiber. The noise absorption coefficient of the panel is linearly related to increases in the thickness of the fiberglass layer. A lamination technique for making the panels is also disclosed.

7 Claims, 3 Drawing Sheets

(56) References Cited

U.S. PATENT DOCUMENTS

| | | |
|---|---|---|
| 5,277,762 A | 1/1994 | Felegi, Jr. et al. |
| 5,558,710 A | 9/1996 | Baig |
| 5,674,594 A | 10/1997 | Sensenig |
| 5,911,818 A | 6/1999 | Baig |
| 6,443,256 B1 | 9/2002 | Baig |
| 6,877,585 B2 | 4/2005 | Tinianov |
| 7,703,243 B2 | 4/2010 | Baig |
| 7,732,043 B2 | 6/2010 | Baig et al. |
| 8,025,769 B2 | 9/2011 | Wiker et al. |
| 8,062,565 B2 | 11/2011 | Mueller et al. |
| 8,100,226 B2 | 1/2012 | Cao et al. |
| 8,147,629 B2 | 4/2012 | Baig |
| 8,403,108 B2 * | 3/2013 | Bliton et al. .................. 181/294 |
| 8,511,429 B1 | 8/2013 | Yu et al. |
| 8,563,449 B2 * | 10/2013 | Mueller .................... B32B 5/08 428/373 |
| 2002/0139611 A1 | 10/2002 | Baig |
| 2009/0253323 A1 * | 10/2009 | Mueller et al. ................ 442/150 |
| 2012/0024625 A1 | 2/2012 | Cao et al. |
| 2014/0054107 A1 * | 2/2014 | Thomas et al. ............... 181/290 |

* cited by examiner

MULTI-LAYER CEILING TILE

FIELD OF THE INVENTION

The field relates to multi-layer non-woven material and methods of forming the same, and more particularly, a less costly multi-layer non-woven material useful to form an acoustical panel having acceptable sound absorption properties. For convenience, the present invention is described below with reference to acoustical ceiling tile.

BACKGROUND OF THE INVENTION

A typical acoustic ceiling tile is a non-woven structure including a core manufactured from base fibers, fillers, and binders. The base fibers are usually mineral fiber such as mineral wool, fiberglass or the like. The fillers are commonly perlite, clay, calcium carbonate, or cellulose fibers as may be derived from recycled newsprint. The binder is typically cellulose fibers, starch, latex, or similar materials. Upon drying, the binder forms bonds with the other materials to form a fibrous network that provides structural rigidity to the core. To be used as a typical ceiling tile, the core should be substantially flat and self-supporting in order to be suspended in a typical ceiling tile grid or similar structure.

Acoustical ceiling tile may be manufactured using a water-felting process as described in U.S. Pat. No. 5,558,710, the teachings of this patent being incorporated herein. The water-felting of dilute aqueous dispersions of mineral wool and lightweight aggregate is a commercial process for manufacturing acoustical ceiling tile. In this process, a dispersion of mineral wool, lightweight aggregate, binder and other ingredients as desired or necessary is flowed onto a moving foraminous support wire, such as that of a Fourdrinier or Oliver mat forming machine for dewatering. The dispersion dewaters first by gravity and then vacuum suction means; the wet mat is dried in heated convection drying ovens, and the dried material is cut to the desired dimensions and optionally top coated, such as with paint, to produce acoustical ceiling tiles and panels.

For many years, acoustical ceiling tile has also been made by a wet pulp molded or cast process such as described in U.S. Pat. No. 1,769,519, the teachings of this patent being incorporated by reference. According to the teaching of this patent, a molding composition is prepared comprising granulated mineral wool fibers, fillers, colorants and a binder, in particular a starch gel, for molding or casting the body of the tile. This mixture or composition is placed upon suitable trays which have been covered with paper or a metallic foil and then the composition is screeded to a desired thickness with a screed bar or roller, A decorative surface, such as elongated fissures, may be provided by the screed bar or roller. The trays, filled with the mineral wool pulp or composition, are then placed in an oven to dry or cure the composition. The dried sheets are removed from the trays and may be treated on one or both faces to provide smooth surfaces, to obtain the desired thickness and to prevent warping. The sheets are then cut into tiles of a desired size.

In connection with ceiling tiles formed of fiberglass materials, the non-woven layer may be prepared using air-laid processing as particularly described in U.S. Pat. No. 8,563,449, assigned to the assignee of the present application, the teachings of this patent being incorporated by reference. Glass fibers are typically provided with a short size or length suitable for air-laid processing and are relatively more expensive than mineral wool fibers. As generally understood, mineral wool fibers are distinct from glass fibers and ceramic fibers.

As used herein, "air-laid" refers to any method or manufacturing process in which the individual ingredients are suspended in an air or other gaseous stream and that preferably form a web, mat or batt on a porous wire web or other porous carrier surface. The web formation process includes metered or regulated pneumatic or fluidized flow of the web forming materials onto the carrier web where it may be retained in a batt or nonwoven mat form with vacuum assist from below. To that end, the process may include the steps of: (a) raw material dispersing and blending, (b) metering and feeding the raw materials to a head box, (c) air-laid forming the raw materials by deposit onto a porous web or carrier, (e) heating and cooling (f) optionally calendaring, (g) optionally laminating and (h) finishing the web.

The formation of the fiberglass web includes consolidation as by adhesion or thermal bonding. Adhesion bonding may include the application of a discontinuous phenolic, latex or other suitable adhesive to bind the fibers to one another. Thermal bonding contemplates incorporation of synthetic bonding fibers, e.g., generally bi-component fibers with polyethylene and polypropylene. Thermal bonding may utilize oven heating, calendaring or both. In all cases, the adhesive or bonding has little or no effect on the tile noise reduction coefficient value.

For non-woven structures to be suitable for acoustical ceiling tile applications, they generally satisfy various industry standards and building codes relating to noise reduction. For example, industry standards typically specify the acoustical ceiling tile to have a noise reduction coefficient (NRC) according to ASTM C423 of at least about 0.55.

A detailed method of measuring NRC is outlined in ASTM C423. NRC is represented by a number between 0 and 1.00, which indicates the percentage of absorbed sound. For example, an acoustical panel having an NRC value of 0.60 will absorb 60% and deflect 40% of the sound. Another method to test the sound absorption property is estimated NRC (eNRC), which is measured using a smaller sample size via an impedance tube as detailed in ASTM E1050-98.

U.S. Pat. No. 6,443,256, owned by the assignee of this application, discloses a mineral wool dual layer ceiling tile wherein the base mat or layer has low mineral wool content and the surface layer has high mineral wool content. The base mat is indicated to contain 5-25 weight % mineral wool and the surface layer contains 70-90 weight % mineral wool. Other ingredients in either or both layers are indicated to include dyes, pigments, inorganic fillers, antioxidants, surfactants, water repellents, fire retardants and the like. The tile is made by a water-felting process and is indicated to provide a noise reduction coefficient (NRC) of at least about 0.50.

SUMMARY OF THE INVENTION

A multi-layer acoustical tile having improved sound absorption properties and a method of making the same are provided wherein the tile layers have distinct properties selected to achieve improved noise suppression at reduced overall costs. For example, the tile may have a base layer formed using a mineral fiber layer such as mineral wool and a surface layer formed of fiberglass with or without a top scrim layer or other acoustically transparent and generally continuous coating that does not interfere with the desired acoustical properties.

In preferred embodiments, the tile includes at least one layer containing mineral wool as the primary fibrous component and at least another layer containing fiberglass as the primary fibrous component. As used herein, "primary" denotes more than about one half or 50% by weight unless otherwise indicated by the context. Each layer may also contain conventional additives and fillers as are known in the art.

It has been found that the fiberglass layer should be placed adjacent the room facing side of the tile in front of the mineral wool layer in order to attain the full acoustic benefits of the fiberglass including a preferred relationship between layer thickness sound absorption. More particularly, it has been found that the overall tile noise reduction coefficient is linearly related to the thickness of the fiberglass layer and that a tile noise reduction coefficient (NRC) value of at least about 0.55 may be achieved with judicious selection and sizing of the fiberglass and mineral wool layers.

Further, a multi-layer acoustical tile may be provided wherein one of the layers suppresses noise of particular frequencies and another of the layers suppresses noise of complementary frequencies. For example, fiberglass layers have been found to absorb high frequency sound waves, e.g., 800-1600 Hz, that tend to be reflected by even relatively thin (e.g. about 0.2" thick) mineral wool layers. In this manner, the layers and tile provide a desired overall noise reduction coefficient that may be designed to accommodate the specific application environment.

Generally, it is believed that the larger and more uniform diameter of the glass fibers (e.g. ranging from about 3 to about 15 microns) and the more uniform array of the fibers in an air-laid fiberglass layer improve the noise reduction coefficient as compared with the greater variations in diameter and length of mineral fibers as well as the greater irregularity of fiber array in the mineral wool fiber layer construction. Air-laid fiberglass layers are believed to also enhance noise absorption due to their lower mat density and lower air resistance. Further the extrusion of glass fibers at a uniform size promotes resonance at a single frequency and sound absorption as compared with the varying fiber diameters of mineral wool fibers. Thus, fiberglass layers are more receptive to achievement of desired and uniform noise absorption characteristics through design of gross layer dimensions.

In accordance with the method of the present invention, the layers of the multi-layer tile may be formed and then joined in a further processing step. The mineral wool layer may be formed in a water-felting or casting process and the fiberglass layer may be formed in an air-laid process. The separately and potentially remotely prepared mineral wool and fiberglass layers may be later joined in a lamination, needling, adhesion and/or combination process. For example, in tiles having two major layers, the base layer and the surface layer may be joined in a lamination process following the separate formation of the layers. The base and surface layers may each be formed using different fibers and manufacturing processes. On the other hand, the fiberglass layer may be formed directly on the mineral wool layer in a sequentially joined water-felting process and air-laid process.

In one embodiment, an acoustical tile comprises a mineral wool fiber layer having a fibrous content comprising at least about 50% by weight of mineral wool fiber with a layer thickness ranging from about ¼" or more, (e.g. up to ⅝") and a fiberglass layer having a fibrous content comprising at least about 50% by weight of glass fiber at a layer thickness ranging from about ¼" to about 1". The mineral wool layer is denser than the fiberglass layer, and the ceiling tile has a total thickness that is substantially provided by the mineral wool layer and fiberglass layer. The ceiling tile has a noise reduction coefficient (NRC) value of at least about 0.55.

The mineral wool fiber or base layer is formulated to have a density of from about 8 lbs/ft$^3$ to about 20 lbs/ft$^3$. If the mineral wool layer is the base layer, it will typically be more dense than the fiberglass layer or layers and, as a base layer, will provide the major structural rigidity and strength of the tile. The fiberglass layer may be formed with a density of from about 1 lb/ft$^3$ to about 20 lbs/ft$^3$.

The relative amounts of the ingredients in the mineral wool layer may be varied, but the formulation is selected to provide a mineral wool or base layer composition that is less costly than the associated layer or layers wherein the fibrous component is primarily glass fiber. Also, fiberglass materials tend to use organic binders resulting in VOC emissions. Such VOC emissions are reduced by the use of mineral wool materials having starch binders in accordance with the invention.

The thickness of the tile is substantially provided by the total of the thicknesses of the mineral wool and fiberglass layers since the thickness of any scrim, veil or continuous coating layer present will only be a small percent (e.g. 1 or 2%) of the total tile thickness. Accordingly, the tile thickness is substantially equal to the sum of the thicknesses of the mineral wool and fiberglass layers. The total thickness of the tile may range from about 0.375" to about 1.625".

DETAILED DESCRIPTION OF THE PREFERRED EMBODIMENT

Figure 1:
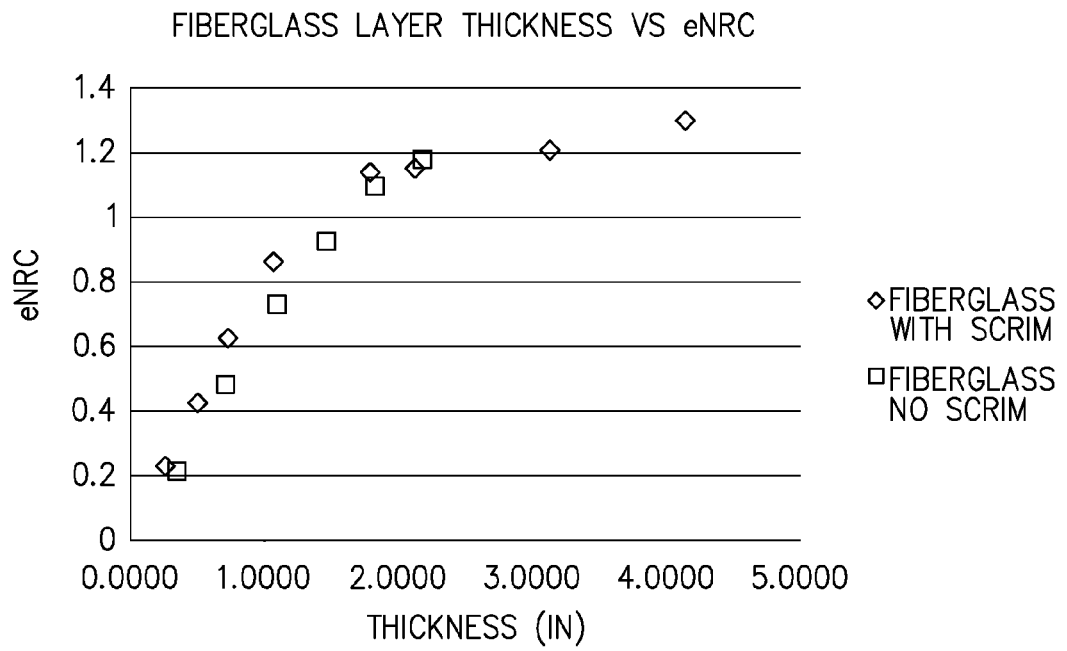
FIG. 1 is a graph illustrating the determined noise reduction coefficients for fiberglass layers of varying thicknesses with and without a scrim or veil overlay.

Herein, the preparation of multi-layer tiles is described with reference to the use of a lamination preparation process using a discontinuous adhesive layer having little or no effect on the overall sound absorption of the tile. To that end, it is convenient to use commercially available tiles that are slit and laminated together to form the desired multi-layer tile. Certain of the tiles may include scrim layers that are removed or maintained as described below.

Currently, in the building products market, acoustical ceiling tiles available from USG Interiors, Inc. of Chicago, Ill., United States of America (USG), the assignee of the present application, enable construction of multi-layer tiles having mineral wool layers and fiberglass layers in accordance with the invention. Examples of mineral wool tiles include those marketed under the trademarks Radar™ and Mars™ by USG. One example of a fiberglass panel is Halcyon® brand panel sold by USG. Certain of these tiles include laminated nonwoven scrims (also known in the art as facings, facers, veils and tissues, among other terms) which are retained or removed in preparation of the multi-layer tile of the invention as described below. The various layers of acoustical panels are formed by binding the mineral wool or fiberglass, as the case may be, with a thermal setting binder or a latex adhesive.

The Radar™ brand tile is a water-felted slag wool or mineral wool fiber panel having a ⅝" thickness and the following composition.

| Material | Weight % |
| --- | --- |
| Slag Wool Fiber | 1-75% |
| Expanded Perlite | 5-75% |
| Cellulose | 1-25% |
| Starch | 5-15% |
| Kaolin | 0-15% |
| Calcium Sulfate Dihydrate | 0-80% |
| Limestone or Dolomite | <2% |
| Crystalline Silica | <5% |
| Vinyl Acetate Polymer | <2% |
| Or Ethylene Vinyl Acetate Polymer | |

As used herein, the Radar™ brand tile did not have a backing and it was provided at full ⅝" thickness having a weight of nominally 13 lbs./ft.³ and slit or laminated to provide layers of lesser or greater thickness. The diameters of the mineral wool fibers vary over a substantial range, e.g. 0.25 to 20 microns, and most of the fibers are in the range of 3 to 4 microns in diameter. The lengths of the mineral fibers range from about 1 mm to about 8 mm.

The Halcyon® brand tile is prepared by USG using an air-laid fiberglass mat and a fiberglass non-woven scrim, supplied by Owens Corning of Toledo, Ohio USA. The scrim was retained or removed as described below.

| Material | Weight % |
| --- | --- |
| Fiberglass Wool | 45-90% |
| Fibrous Glass (Continuous filament) | 5-10% |
| Urea Phenol-Formaldehyde Resin | 1-20% |
| Urea Formaldehyde Binder (cured) | 1-10% |
| Vinyl Alcohol Polymer | <2% |
| Vinyl Acetate Polymer | <4% |
| Or Ethylene Acetate Polymer | |

As used herein, the Halcyon® brand tile was provided at a full thickness of one inch having a weight of nominally 5 lbs./ft.³ and slit or laminated to provide layers of lesser or greater thickness as reported. The glass fiber diameter is in the range of from about 8 to about 12 microns, and the fiber lengths are in the range of from about 5 mm to about 15 mm.

Initially, base lines relating determined NRC and layer thickness were measured for the fiberglass and mineral wool layers prepared from Halcyon® and Radar™ brand tiles as described below. To that end, fiberglass and mineral wool layers of the desired test thickness were prepared and four inch diameter circular samples were cut from the layers for eNRC measurement in an impedance tube in accordance with ASTM E1050-98.

In the case of fiberglass, a series of test layers ranging from about ½" to 2 inches in thickness were prepared in ¼" size increments using Halcyon® brand ceiling tile. In addition, 3 and 4 inch thick samples were prepared and evaluated as reported below.

Halcyon® ceiling tile is available with a 1 inch thickness and thinner samples were prepared by slitting appropriate material from the back surface of the tile. For thicknesses greater than 1 inch, slit fiberglass layers were added to the back side of the layer using 3M™ SUPER 77™ multipurpose aerosol adhesive sold by the 3M Company of St. Paul, Minn., United States of America. The adhesive was applied as an aerosol and formed a discontinuous layer that is believed to provide little or no effect upon the overall noise absorption. The samples were tested with and without a final veil scrim on the exposed surface layer. The veil scrim is a non-woven fiberglass thin sheet layer having a weight of from about 15 to about 30 g/ft².

Referring to FIG. 1, the results of the fiberglass layer tests are reported. The noise reduction coefficient increases with thickness up to about a two inch thickness and thereafter further thickness increases have a negligible effect. As shown, the eNRC is not significantly affected by the presence of the scrim, but it does appear to provide a minimal increase.

The sound absorption properties of mineral wool layers were evaluated at about ¼ thickness increments ranging from about ¼" to about 1¼" thick with and without a scrim. In this case, the Radar™ brand mineral wool samples were water-felt formed and finished to contain holes and fissures. For comparison purposes, a scrim was applied to the exposed surface of some of the samples using the same aerosol adhesive and technique as described above.

Figure 2:
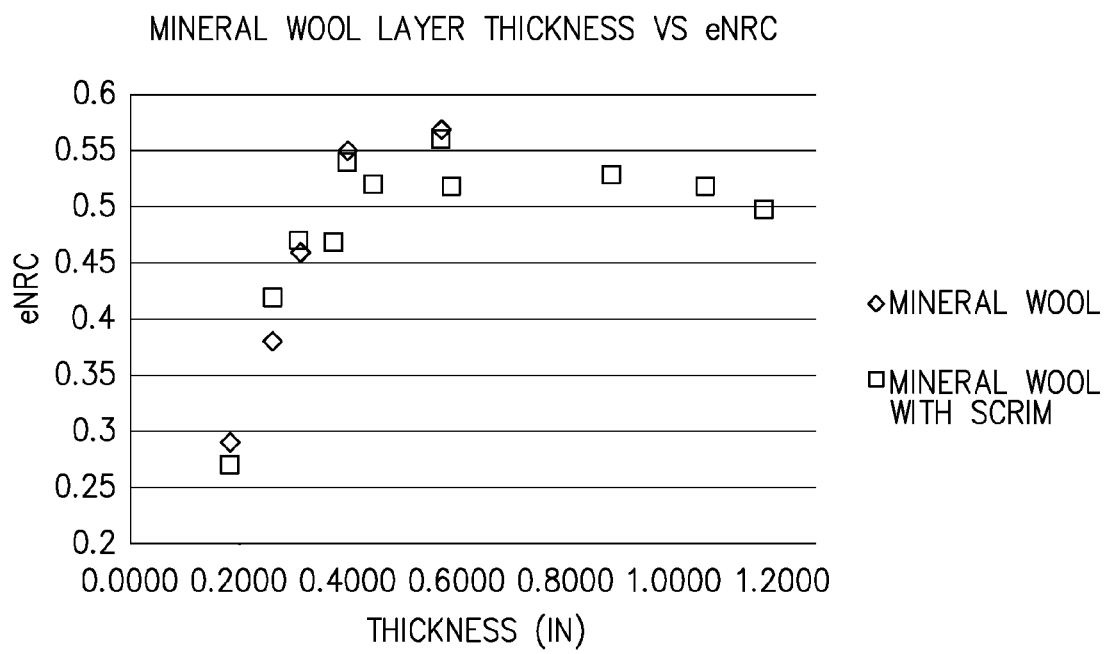
FIG. 2 is a graph illustrating the determined noise reduction coefficients for mineral wool layers of varying thicknesses and having holes and fissures extending therein.

Referring to FIG. 2, the mineral wool test results are graphically reported. The mineral wool layers display increasing sound absorption with increasing thickness in a manner similar to the fiberglass layers of FIG. 1. Due to the increased density and reduced porosity of the mineral wool layers as compared with fiberglass layers, the maximum sound absorption is achieved at a lesser thickness. This is believed to be related to the concept of infinite eNRC due to the inability of sound waves to penetrate the layer after a certain thickness. Consequently, the added thickness is believed to have no effect on sound absorption and the measured eNRC value. As airflow resistivity increases, the thickness required to achieve infinite eNRC decreases.

Figure 3:
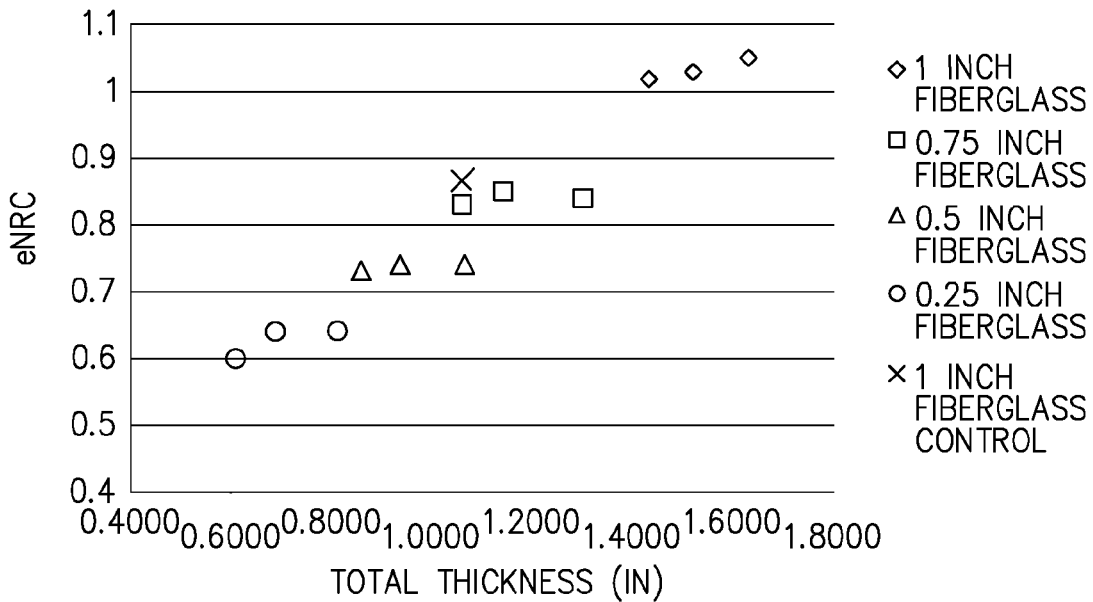
FIG. 3 is a graph illustrating the determined noise reduction coefficients for mineral wool layers of substantially constant thicknesses laminated to surface layers of fiberglass of varying thicknesses.

Referring to FIG. 3, the effect on noise absorption of an increasing fiberglass layer thickness on a ⅝" thick mineral wool base was evaluated. Using the slitting and lamination techniques described herein, test samples were prepared using a ⅝" thick mineral wool base layer laminated to a ¼", ½", ¾", and one inch thick fiberglass surface layers. In addition, samples were prepared having the mineral wool layer thicknesses reduced by 0.1" and by 0.2" for each fiberglass layer thickness so as to result in four sub-groups, each containing three data points as shown in FIG. 3. The noise reduction coefficient was determined for each sample and the results are graphically reported in FIG. 3 together with the performance of a one inch thick fiberglass control.

As reported in FIG. 3, increasing thickness of the mineral wool layer resulted in minimal increases in eNRC as shown by comparison of the three data points within each sub-group. However, increasing thickness of the fiberglass layer yielded significant increases in noise absorption and the noise reduction coefficient (eNRC) as shown by comparison of the four sub-groups of data points.

In accordance with the invention, the cost savings provided by the use of the less expensive mineral wool fiber layers do not result in a comparable reduction in noise absorption. For example, it should be appreciated that comparable noise reduction coefficient values are achieved by the less expensive inventive constructions. That is, similar noise reduction coefficient values are provided by combining a 1½" or a 1" thick fiberglass surface layer with a ⅝" thick mineral wool base layer.

With further reference to FIG. 3, the application of a 1" thick fiberglass layer to the ⅝" thick mineral wool layer increased the eNRC to greater than about 1.0. This corresponds with a 20.69% increase in eNRC as compared to the 1" thick fiberglass layer control. Similarly, the ¾" fiberglass and ⅝" mineral wool laminate eNRC value almost matched the one inch thick control. In this manner, the noise absorption properties of the fiberglass layer are retained and the overall tile costs are reduced by the use of the relatively less expensive mineral wool layer.

Figure 4:
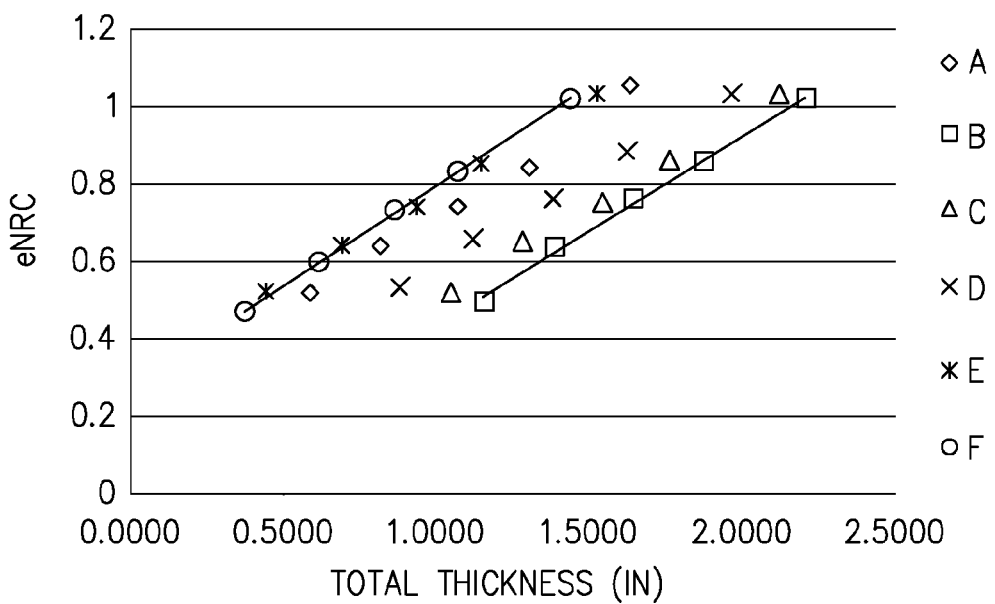
FIG. 4 is a graph illustrating the determined noise reduction coefficients for mineral wool base layers of varying thicknesses laminated to fiberglass surface layers of varying thicknesses.

Referring to FIG. 4, the effect of increasing the thickness of the fiberglass surface layer on mineral wool base layers of selected thicknesses is reported. For this purpose, series of laminates A through F were prepared. Each series of laminates has a mineral wool base layer of selected constant thickness and the base layers are laminated to incrementally thicker fiberglass surface layers. The base layer thicknesses for laminates A-F were respectively equal to 0.4", 0.5", 0.6", 0.75", 1.0" and 1.2". Each base layer was tested with fiberglass surface layers having thicknesses of ¼", ½", ¾", and 1". The layers were prepared using the above described slitting and lamination techniques.

The noise reduction coefficient (eNRC) for each of the laminates was measured and plotted against the total laminate thicknesses as shown in FIG. 4. The smallest total thickness data point for each laminate corresponds with the eNRC value of the mineral wool base layer alone.

With further reference to FIG. 4, the graph shows the linear relationship between the noise reduction coefficient value and the thickness of the fiberglass surface layer. That is, the noise reduction coefficient value linearly increases in response to increases in the thickness of the fiberglass layer. Using the least squares method, the slopes of the curves through each series of data points A through F are reported below. For clarity of illustration, only the curve B' drawn through the data points B and the curve F' drawn through the data points F are shown in the drawing. (Curves A', C', D' and E' are not shown.)

| Data Points | Curve | Slope of Curve |
| --- | --- | --- |
| A | A' | 0.4859 |
| B | B' | 0.4716 |
| C | C' | 0.4554 |
| D | D' | 0.4899 |
| E | E' | 0.4720 |
| F | F' | 0.5150 |

The average slope is 0.481633, the standard deviation is 0.020404 and the R squared value for each curve is in the 0.99 range. Thus, the equation relating the linear relationship is:

$$eNRC = 0.481633 \text{ (thickness of fiberglass)} + eNRC \text{ of base.}$$

The equation and calculations may be simplified as follows to provide working design approximations:

$$eNRC = 0.5 \text{ (thickness of fiberglass)} + eNRC \text{ of base.}$$

This enables tiles of a desired noise reduction coefficient value and a reduced cost to be designed and produced using a fiberglass surface layer of an appropriate thickness for the desired sound absorption combined with a less expensive mineral wool base layer.

Figure 5:
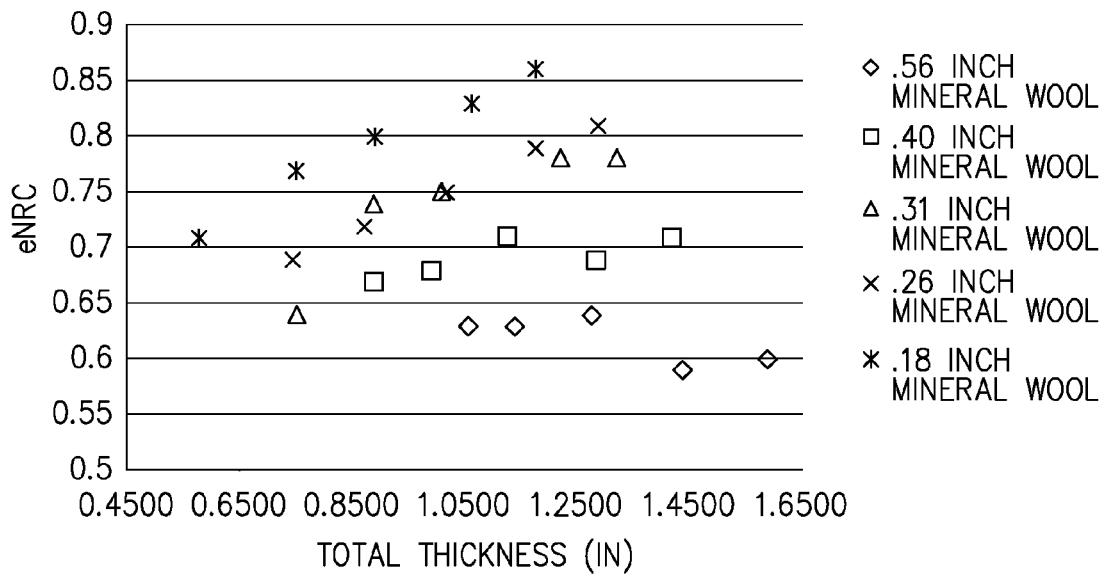
FIG. 5 is a graph illustrating the determined noise reduction coefficients for fiberglass base layers of varying thicknesses laminated to mineral wool surface layers of varying thicknesses.

Referring to FIG. 5, the positioning of mineral wool as a room facing or exposed surface in front of fiberglass in the tile construction is evaluated. The mineral wool layers were made by slitting Radar™ brand tile. The tile and mineral wool layers had holes and fissures that did not appear to extend through the entire original tile thickness. In this manner, mineral wool layers having thicknesses of 0.18", 0.26", 0.31", 0.40" and 0.56" were prepared. Fiberglass layers having thicknesses of ¼", ½", ¾", and 1" were prepared and laminated to each of the mineral wool layers using the above techniques. Samples were prepared for impedance tube tests as described above.

As shown in FIG. 5, the thickness of the fiberglass layer did not affect the determined noise reduction for the 0.56" thick mineral wool layer. This is believed due to the high air resistivity of the mineral wool resulting in the reflection of the sound wave, and therefore, the inability of the sound waves to penetrate the mineral wool.

Mineral wool thickness of less than 0.50" displayed a limited relation with fiberglass layer thickness believed to result from sound waves passing through the mineral wool layer. Accordingly, there is also detected a noise absorption increase with increasing fiberglass thickness. For mineral wool thicknesses approaching about 0.26 or less, there appears to be a correlation between fiberglass thickness and sound absorption.

With further reference to FIG. 5, it should be appreciated that mineral wool is presently less expensive than fiberglass and there is an economic preference for the maximizing the thickness of the former.

Figure 6:
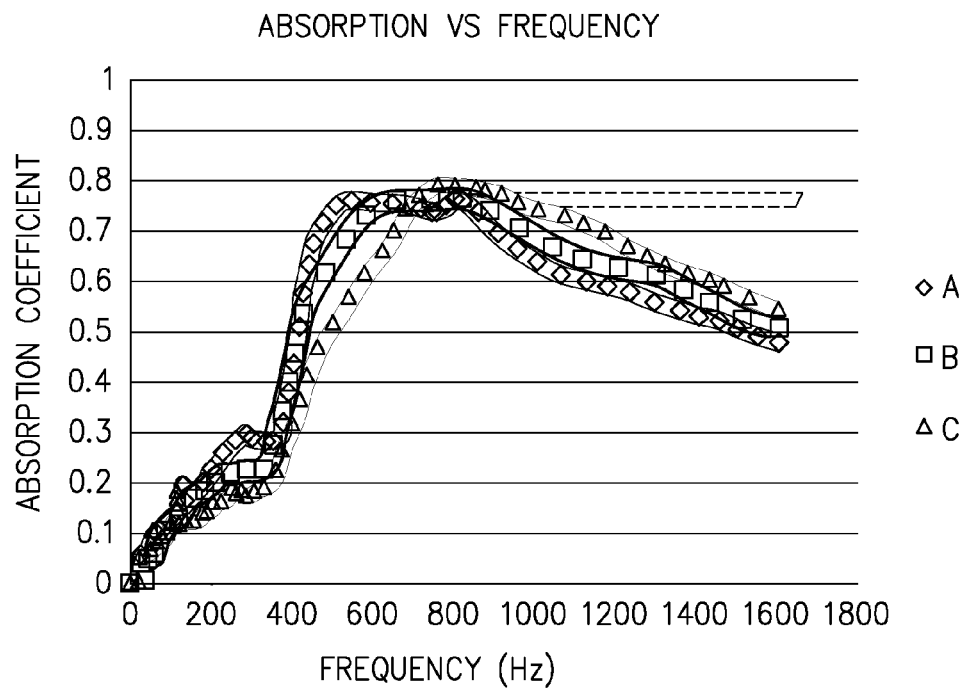
FIG. 6 is a graph illustrating the determined noise reduction coefficients for a relatively thin mineral wool surface layer positioned on a fiberglass base layer.

The positioning of mineral wool in front of fiberglass is further evaluated in FIG. 6. FIG. 6 relates frequency and determined noise reduction coefficient for 0.18" thick mineral wool layer positioned in front of a 1" thick fiberglass layer. Curves A, B and C comprise the average data determined for these samples. As shown, the noise absorption coefficient decreases at higher frequencies. This decrease is believed to show that the 0.18" thick mineral wool is sufficient to reflect higher frequencies before they can enter the fiberglass layer and be absorbed. This is further confirmed by the dotted curve showing the expected performance of a fiberglass layer without an interfering mineral wool layer. More particularly, fiberglass layers are characterized by a substantially constant absorption coefficient between about 800 to 1600 Hz.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A multi-layer acoustical panel having improved sound absorption properties including a fiberglass layer and a mineral wool layer;

said fiberglass layer having a fibrous content comprising at least about 50% by weight of glass fiber and an associated binder providing structural rigidity and a density of from about 1 lb/ft$^3$ to about 20 lbs/ft$^3$;

said mineral wool layer having a fibrous content comprising at least about 50% by weight of mineral wool fiber and an associated binder providing structural rigidity and a density of from about 8 lbs/ft$^3$ to about 20 lbs/ft$^3$;

said mineral wool layer being more dense than said fiberglass layer, said panel having a total thickness that is substantially provided by said fiberglass layer and mineral wool layer; and said fiberglass and mineral wool layers being joined together by laminating, needling, adhesion or a combination thereof and having a structural rigidity making the panel self-supporting;

said panel having a noise reduction coefficient value of at least about 0.55; wherein the panel noise reduction coefficient value linearly increases in response to increases in the thickness of the fiberglass layer; and wherein the panel is a ceiling tile, the mineral wool layer thickness is about ⅝" and the fiberglass layer thickness is in the range of from about ¾" to about 1", the fiberglass layer is an air-laid fiberglass surface layer and the mineral wool layer is a water-felted mineral wool base layer, and the fiberglass layer includes glass fibers having a diameter in the range of from about 3 microns to about 15 microns and lengths in the range of from about 5 mm to about 15 mm.

2. The panel of claim 1, wherein said noise reduction coefficient is determined by the combined sound absorption properties of said mineral wool layer and said fiberglass layer.

3. The panel of claim 1, wherein said noise reduction coefficient value is generally described by the formula:

Noise Reduction Coefficient=0.5 (inch thickness of the fiberglass layer)+the noise reduction coefficient of the mineral wool base.

4. The ceiling tile of claim 1, wherein said ceiling tile has a room facing front side and an opposed rear side, and said fiberglass layer is located at said front side and said mineral wool layer is located at said rear side.

5. The ceiling tile of claim 4, further including a fiberglass veil mounted to said fiberglass layer at said room facing front side of said tile.

6. The ceiling tile of claim 4, wherein said ceiling tile total thickness is in the range of from about 1-⅜" to about 1-⅝".

7. The ceiling tile of claim 1, wherein said ceiling tile total thickness is substantially equal to the combined thicknesses of said mineral wool layer and said fiberglass layer.

* * * * *